United States Patent
Le Bec

(10) Patent No.: US 6,991,732 B2
(45) Date of Patent: Jan. 31, 2006

(54) PROCESS FOR THE RECOVERY OF FLUOROSURFACTANTS BY ACTIVE CHARCOAL

(75) Inventor: Remi Le Bec, Labastide Cezeracq (FR)

(73) Assignee: Arkema, Puteaux (FR)

( * ) Notice: Subject to any disclaimer, the term of this patent is extended or adjusted under 35 U.S.C. 154(b) by 27 days.

(21) Appl. No.: 10/875,146

(22) Filed: Jun. 23, 2004

(65) Prior Publication Data

US 2005/0000904 A1    Jan. 6, 2005

Related U.S. Application Data

(60) Provisional application No. 60/509,125, filed on Oct. 6, 2003.

(51) Int. Cl.
*B01D 15/04*    (2006.01)
(52) U.S. Cl. ...................................... 210/670; 210/694
(58) Field of Classification Search ................ 210/670, 210/694
See application file for complete search history.

(56) References Cited

U.S. PATENT DOCUMENTS

| | | |
|---|---|---|
| 3,882,153 A | 5/1975 | Seki et al. |
| 4,218,517 A | 8/1980 | Van Ooij |
| 4,282,162 A | 8/1981 | Kuhls |
| 6,436,244 B1 | 8/2002 | Fuhrer et al. |
| 6,518,442 B1 | 2/2003 | Felix et al. |
| 6,613,941 B1 | 9/2003 | Felix et al. |
| 2002/0151748 A1 | 10/2002 | Jones |

FOREIGN PATENT DOCUMENTS

| | | |
|---|---|---|
| DE | 199 33 696 A1 | 7/1999 |
| EP | 0460284 B1 | 11/1990 |

*Primary Examiner*—Chester T. Barry
(74) *Attorney, Agent, or Firm*—Thomas F. Roland

(57) ABSTRACT

The present invention relates to a process for the recovery of a fluorosurfactant present in an aqueous solution, in a gaseous effluent or in both involving a) obtaining an aqueous solution or gaseous effluent comprising 1 to 1,000 ppm of surfactant, b) removing any suspended solids, c) optionally concentrating the solution, d) passing the aqueous solution over a stationary bed of granular active charcoal such that all the surfactant is adsorbed without any solvents being adsorbed, e) halting the passage of the solution and gaseous effluent over the beds of activated charcoal which are eluted with a solution comprising a solvent and an inorganic acid, and then f) treating the solution recovered in stage e) to regenerate the fluorosurfactant.

6 Claims, No Drawings

PROCESS FOR THE RECOVERY OF FLUOROSURFACTANTS BY ACTIVE CHARCOAL

This application claims benefit, under U.S.C. §119(a) of French National Applications Number 03.08033, filed Jul. 2, 2003; and also claims benefit, under U.S.C. §119(e) of U.S. provisional application No. 60/509,125, filed Oct. 6, 2003.

FIELD OF THE INVENTION

The present invention relates to a process for the recovery of fluorosurfactants by active charcoal, more specifically surfactants which are used for the synthesis of fluoropolymers.

BACKGROUND OF THE INVENTION

Fluoropolymers are generally manufactured under emulsion or suspension conditions in water. A dispersion of the monomers in water is prepared in a stirred reactor using a surfactant and then a chain-transfer agent and an initiator are added. The polymerization is carried out and then the fluoropolymer (it is in the form of solid particles) and the water are separated by any means.

Depending on the nature of the surfactant and its proportions, the process is an "emulsion" process, a "suspension" process or any other process derived from the emulsion or from the suspension (microsuspension, miniemulsion, and the like). After the end of the polymerization, the fluoropolymer is separated from the water and possible residues of the reactants used.

In the case of suspension-type processes, the fluoropolymer exists in the form of a granular dispersion, the mean size of the grains of which makes it possible to directly filter and wash, for example by passing pure water into the filtration system.

In the case of emulsion-type processes, the polymer exists in the form of a latex composed of very fine particles, the mean diameter of which is generally less than 1 micron. This latex can be coagulated and optionally concentrated by removing a portion of the water, for example by centrifuging. In the coagulated state, it is also possible to obtain an aerated cream, less dense than water, which can be washed with deionized water according to techniques already described in the prior art (U.S. Pat. No. 4,218,517 and EP 0 460 284). The washed cream can then be dried by bringing it into contact with a hot gas in an atomizer and the fluoropolymer is collected as a powder.

In all these processes, water is obtained as by-product, but a gaseous effluent, which can comprise residual matter from the manufacturing operation, such as fluorosurfactants, possibly traces of solvent and various suspended solid impurities, is also obtained as by-product. The invention relates to the recovery of these surfactants. This recovery is desirable first because these surfactants might be dangerous to the environment and also because of their high cost. Among fluorosurfactants, the invention relates more particularly to ammonium perfluorooctanoate.

U.S. Pat. No. 3,882,153 discloses the passage of aqueous solutions of fluorosurfactants over ion-exchange resins. The fluorosurfactants are retained on the resin. U.S. Pat. No. 4,282,162 discloses a process similar to the above but discloses in addition the elution by an inorganic acid (HCl) and a solvent (methanol) to regenerate the resin and recover the surfactant. U.S. Pat. No. 6,613,941 discloses a process for isolating fluorosurfactants present in wastewater. The very fine solids and/or the fractions which can be converted to solids are first removed from the wastewater, preferably by precipitation, the wastewater is subsequently brought into contact with an ion-exchange resin and the fluorosurfactants are eluted from the latter. U.S. Pat. No. 6,518,442 discloses a similar process except that, in the preliminary stage, the very fine solids are not removed but are stabilized with another non-ionic surfactant, which surfactant is therefore not retained on the resin, which would make it possible to avoid blinding of the resin column by the solid particles. U.S. Pat. No. 6,436,244 discloses a process for eluting fluorosurfactants after their adsorption on a resin.

The publication by D. Prescher et al, Umweltverhalten von fluortensiden [Environmental behaviour of fluorosurfactants], in Acta hydrochim. hydrobiol., 14(3) (1986), pages 293–304, describes the removal of surfactants present in wastewater by bringing it into contact with active charcoal or ion-exchange resins. For example, the operation is carried out batchwise by placing the wastewater in a vessel equipped with a stirrer, by then adding powdered active charcoal thereto and by stirring for 30 minutes. A continuous process by passing the wastewater over granular active charcoal or over ion-exchange resins is also described. Surfactants of sodium perfluoroalkanoate type are found to adsorb well on powdered active charcoal and 10 to 30 times less well (that is to say that 10 to 30 times less surfactant is adsorbed per gram of charcoal) on granular charcoal. No elution is described and, a fortiori, no regeneration of the charcoal or of the surfactant for the purpose of their reuse is described.

It has now been found that it is possible to completely remove surfactants of the ammonium perfluoroalkanoate type present in wastewaters or gaseous effluents by passing these waters or these effluents over granular active charcoal and then that they can be eluted and regenerated, along with the active charcoal.

SUMMARY OF THE INVENTION

The present invention relates to a process for the recovery of a fluorosurfactant present either in an aqueous solution or in a gaseous effluent or in both an aqueous solution and a gaseous effluent, comprising the steps of:
  a) obtaining:
    a1) an aqueous solution comprising:
      1 to 1,000 ppm of surfactant,
      0 to 1,000 ppm of solvents, expressed in COD (chemical oxygen demand),
      0 to 1,000 ppm of suspended solids; and/or
    a2) an gaseous effluent, composed essentially of air, comprising:
      1 to 1,000 ppm of surfactant,
      1 to 10% by volume of water,
      1 to 1,000 ppm of solids;
  b) removing suspended solids wherein:
    b1) the solution from stage a1 is filtered and/or clarified to remove the suspended solids,
    b2) the effluent from stage a2) is optionally passed into a filter to remove the solid particles;
  c1) optionally concentrating the solution from stage b1);
  d) passing the aqueous solution over a stationary bed (B1) of granular active charcoal such that all the surfactant is adsorbed on (B1) without the solvents being adsorbed, the gaseous effluent over another stationary bed (B2) of granular active charcoal such that all the surfactant is adsorbed on (B2);

e) halting the passage of the solution over (B1) and the passage of the gaseous effluent over (B2), and (B1) and (B2) are eluted with a solution comprising a solvent and an inorganic acid; and f) treating the solution recovered in stage e) to regenerate the fluorosurfactant.

DETAILED DESCRIPTION OF THE INVENTION

As regards the fluorosurfactant, use is advantageously made of an ionic surfactant derived from an organic acid or base. U.S. Pat. No. 4,025,709, U.S. Pat. No. 4,569,978, U.S. Pat. No. 4,360,652, EP 626 396 and EP 0 655 468 disclose processes for the synthesis of PVDF (poly(vinylidene fluoride)) by aqueous emulsification of VDF (vinylidene fluoride) and its polymerization; numerous surfactant formulae are found therein.

Mention may be made, by way of example, of those of general formula: $ZC_nF_{2n}COOM$, in which Z is a fluorine or chlorine atom, n is an integer with a value from 6 to 13 and M is a hydrogen or alkali metal atom or an ammonium group or an ammonium group comprising at least one lower alkyl substituent.

Mention may also be made of lithium perfluoroalkanoates of formula $F_3C(CF_2)_{n-2}CO_2Li$ where n=7, 8, 9 and 10.

Use is advantageously made of ammonium perfluorooctanoate and ammonium perfluorononanoate or their mixtures, that is to say the product of formula $ZC_nF_{2n}COOM$ in which Z is F, M is ammonium and mean n is between 7 and 8.

As regards the solution of stage a1), the concentration of surfactant is advantageously between 10 and 200 ppm and preferably between 20 and 100 ppm. The concentration of solvents is usually between 0 and 500 ppm and generally of the order of 200 to 500 ppm. The content of suspended solids is usually between 0 and 500 ppm and generally of the order of 200 to 500 ppm.

As regards stage b1), any known process and/or any filtration/clarification device is used. Mention may be made, by way of example, of coagulation with 100 mg/l (of the solution) of Claral® (form of polyaluminium chloride), then flocculation with 5 mg/l of strong cationic flocculant (for example, EM840 L from Floerger®), then separation by settling.

As regards stage b2), use is advantageously made of a sleeve filter.

As regards stage c1), use may be made of any known concentrating device. Use is advantageously made of reverse osmosis. A concentration of 10 to 20 times, both for the surfactants and for the solvents, is obtained.

As regards stage d) and the aqueous solution, use may be made of any device for bringing a liquid into contact with a substance in a stationary bed. This device is known in itself. The contact time (ratio of the volume of the bed to the hourly space velocity of the solution) is at least 0.06 hour and can be higher. Furthermore, it is recommended that the linear rate of the solution (flow rate of the solution divided by the column cross section) be between 1 and 10 m/h and that the minimum bed height be 0.5 m. In practice, the height of the bed is at least 2 to 3 m in order to have a sufficient gap between 2 regenerations.

The active charcoal can be prepared from carbonaceous materials and can then optionally be agglomerated. Active charcoals are products resulting from the carbonization of various carbonaceous materials of mineral origin (coal, lignite, and the like), vegetable origin (wood, coconut, bark, peat, and the like) or even polymeric origin which have been subjected to an activation treatment with steam at approximately 900–1000° C. (physical activation) which confers a high porosity and a high adsorbent power on them. These adsorbent properties have been made use of for a long time in the treatment, separation or purification of gases and in the decoloration, purification and deodorization of liquids.

When they are brought into contact with liquids in batch-wise processes, they are generally used in the form of powders with a mean particle size generally of less than 100 μm as powders make it possible to achieve very efficient intimate active charcoal/liquid contact. In the percolation treatment processes, the active charcoal is instead used in the form of rods or granules to avoid any inopportune movement of the adsorbent layer.

When the active charcoal is brought into contact with gases (adsorbent beds), excessively fine particle sizes with an excessively high pressure drop and which increase the risk of blinding the equipment are avoided.

It is also possible to prepare the active charcoal by the action of a dehydrating and/or oxidizing agent (phosphoric acid, zinc chloride) on ligneous materials (such as wood, coconut shells, coal) at a relatively low temperature (less than 600° C.) without prior carbonization, the chemical substance being subsequently removed from the activated charcoal by successive washing operations, and, if necessary, milling to the desired particle size. The active charcoals thus obtained ("chemical active charcoals") exhibit a broader porosity.

One method for the preparation of agglomerated active charcoal consists in mixing a hydrocarbonaceous material, such as coal, peat, peat coke, lignite coke or wood charcoal, with coal or wood pitch or tar, then agglomerating the mixture by compacting and, finally, crushing it to, or extruding it through a die at, the desired particle size. The agglomerated products are subsequently devolatilized at a temperature of 400–600° C. before activation by gasification in an oxidizing atmosphere (steam, $CO_2$, $H_2O/CO_2$ mixture). If the starting hydrocarbonaceous material is composed of fruit shells, for example coconut shells, it is not necessary to mix them with pitch or tar before the devolatilization and activation stages as grains within the desired particle size range are obtained by simple crushing, typically of the order of a millimeter.

Generally, it is preferable to use, for the treatment of liquids, granules with a mean diameter of the order of 1 mm and, for the treatment of gases, granules (or extrudates) with a mean diameter of the order of at least 3 mm.

By way of example, on using active charcoals as grains (granules) based on physically activated coal or as grains based on chemically activated wood, the amount of surfactant adsorbed is of the order of 20 to 30 g per 100 g of active charcoal.

The active charcoal used in the bed (B2) to treat the gaseous effluent can be of the same type as that used in the bed (B1) to treat the aqueous solution.

As regards stage e), the solution used to elute the adsorbed surfactant advantageously comprises methanol and sulphuric acid. It preferably comprises, by weight, 75 to 95% of methanol, 5 to 15% of sulphuric acid and 0 to 20% of water. A particularly preferred composition comprises 89% of methanol, 7.4% of sulphuric acid and 3.6% of water. It is recommended, after halting the elution solution, to rinse the bed of active charcoal with pure water. This stage makes it possible to ensure that there will be no minor episodes of contamination by a material remaining from the desorption on restarting the adsorption column. The amount of pure water to be used is advantageously at least equal to the volume of the active charcoal bed.

Regarding stage f), this is the same treatment as for the solutions recovered when the elution is carried out of an ion-exchange resin through which a solution identical to the solution of stage a1) has been passed.

This technique is disclosed in U.S. Pat. No. 4,282,162, U.S. Pat. No. 5,442,097 and U.S. Pat. No. 5,591,877. It consists, as regards the surfactants in which M is ammonium, in esterifying the solution with methanol to obtain the methyl ester, in distilling the ester and then subjecting it to ammoniacal hydrolysis to recover the APFO in solution.

EXAMPLES

Example 1

The starting material is an aqueous solution resulting from a process for the manufacture of a fluoropolymer: this solution comprises 54 mg/l of ammonium perfluorooctanoate surfactant, 350 mg/l of suspended particles, and various organics, expressed as Chemical Oxygen Demand (COD), at approximately 240 mg/l.

100 ml of this solution and 0.1 g of granular active charcoal, type GAC 1240 (based on steam-activated coal), reduced beforehand to a powder at less than 80 $\mu$m, are introduced into a flask; this suspension is stirred for 4 hours and then it is filtered through a 0.45 $\mu$m membrane.

After filtering, the solution comprises less than 5 mg/l of fluorosurfactant (detection limit based on fluorine; in fact, less than 5 □g/l can be specified when intensive analyses are carried out by chromatography/mass spectrometry) and approximately 220 mg/l of COD. The active charcoal therefore clearly selectively adsorbs the fluorosurfactant.

Example 2

The granular active charcoal (0.4–1.7 mm) mentioned above is completely saturated. 65 g of this charcoal are inserted in a column with a diameter of 2 cm over a height of 49 cm. The solution mentioned in Example 1 is treated by coagulation with 100 mg/l of Claral (form of polyaluminium chloride), then flocculation with 5 mg/l of strong cationic flocculant (EM840 L from Floerger) and then separation by settling; this makes it possible to reduce the suspended matter to less than 50 mg/l. This solution is subsequently percolated through the column at a mean flow rate of 2 liters/h while withdrawing samples at the column outlet, until 308 liters have passed.

All the samples at the column outlet up to 298 liters comprise less than 5 mg/l of fluorosurfactant (detection limit based on fluorine). After 308 liters have passed, the concentration has increased to 10 mg/l. This corresponds to an overall adsorption capacity of the active charcoal of 25% (g of surfactant adsorbed per 100 g of charcoal).

Example 3

Desorption tests are carried out with samples of saturated active charcoal resulting from Example 2, either by heating at 160° C. under vacuum for 4 hours or by extraction with a liquid (5 g of charcoal in 50 ml of liquid for 4 h) and then drying at 100° C. The same simplified test is subsequently carried out as Example 1, namely 100 ml of solution in contact with 0.1 g of desorbed charcoal. The results as concentration of surfactant after filtration are as follows:

Fresh charcoal: <5 mg/l (recalling Example 1)
Charcoal desorbed at 160° C.: 12 mg/l
Charcoal desorbed with ethyl acetate: 12 mg/l
Charcoal desorbed with methanol: 15 mg/l
Charcoal desorbed with an 89% methanol, 7% $H_2SO_4$, 4% water solution: <5 mg/l.

Only the final method appears capable of correctly desorbing the active charcoal in order for it to recover its initial activity.

Example 4

Several cyclic tests of adsorption and then of desorption of the granular active charcoal employed in a column as in Example 2 are carried out. To accelerate the tests, the starting material is a solution comprising 500 mg/l of fluorosurfactant. During the adsorption phase, the percolation is continued until virtually complete saturation of the active charcoal, that is to say until the concentration of surfactant at the column outlet is equivalent to that entering. The resulting capacity of the active charcoal is calculated by material balance with regard to that which has remained in the column. For the desorption, 800 ml of an 89% methanol, 7% $H_2SO_4$ and 4% water solution (i.e. 5 volumes of empty column) are injected at a flow rate of 1 liter/h, the samples being collected at the column outlet every 160 ml. A portion of these samples is separated into 2 liquid phases: one regarded as pure surfactant, the other being analysed for total fluorine; by calculation of material balance, the total amount of surfactant desorbed can be determined.

These tests were repeated over 4 cycles with the following results, expressed as capacity (g of surfactant per 100 g of charcoal):

| Adsorption 1 | Desorption 1 | Adsorption 2 | Desorption 2 | Adsorption 3 | Desorption 3 | Adsorption 4 |
| --- | --- | --- | --- | --- | --- | --- |
| 27.1% | 29.5% | 26.7% | 26.8% | 28.9% | 28.2% | 25.5% |

Good recovery of the surfactant and maintenance over several cycles of the capacity of the active charcoal (within the limits of the accuracy of the material balances) are found. The trend of the concentration profiles (to adsorption and to desorption) is the same overall over the various cycles. This demonstrates the possibility of readily using this method industrially over a large number of cycles. This method is a priori more economical than that using ion-exchange resins, which are more expensive than active charcoal.

The invention claimed is:
1. Process for the recovery of a fluorosurfactant present in an aqueous solution comprising the steps of:
   a) obtaining an aqueous solution comprising:
      1 to 1,000 ppm of surfactant,
      up to 1,000 ppm of solvents, expressed in COD (chemical oxygen demand), and
      0 to 1,000 ppm of suspended solids;
   b) filtering and/or clarifying the aqueous solution to remove any suspended solids which may be present;
   c) optionally concentrating the resulting filtered and/or clarified solution from step (b);
   d) passing the aqueous solution from step (b) or (c) over a stationary bed of granular active charcoal such that all the surfactant is adsorbed on the charcoal without the solvents being adsorbed;

e) halting the passage of the solution over the bed of granular activated charcoal and eluting the same with a solution comprising a solvent and an inorganic acid; and f) treating the solution recovered in stage e) to regenerate the fluorosurfactant.

2. Process according to claim 1, in which the surfactant is of general formula: $ZC_nF_{2n}COOM$, in which Z is a fluorine or chlorine atom, n is an integer with a value from 6 to 13 and M is a hydrogen or alkali metal atom or an ammonium group or an ammonium group comprising at least one lower alkyl substituent.

3. Process according to claim 1, in which the concentration of the surfactant in the aqueous solution is between 10 and 200 ppm.

4. Process according to claim 1, in which the concentration of the solvents in the aqueous solution is up to 500 ppm.

5. Process according to claim 1, in which the content of the suspended solids in the aqueous solution is up to 500 ppm.

6. Process according to claim 1, in which the elution solution comprises, by weight, 75 to 95% of methanol, 5 to 15% of sulphuric acid and 0 to 20% of water.

* * * * *